(12) United States Patent
Skaja

(10) Patent No.: US 6,777,062 B2
(45) Date of Patent: *Aug. 17, 2004

(54) CUSHIONING STRUCTURE FOR FLOOR AND GROUND SURFACES

(75) Inventor: Joseph J. Skaja, Sunset Beach, TX (US)

(73) Assignee: Skydex Technologies, Inc., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/976,262

(22) Filed: Oct. 12, 2001

(65) Prior Publication Data

US 2002/0119276 A1 Aug. 29, 2002

Related U.S. Application Data

(60) Provisional application No. 60/240,006, filed on Oct. 12, 2000.

(51) Int. Cl.[7] .............................. D06N 7/04; B32B 1/00
(52) U.S. Cl. ...................... 428/143; 428/147; 428/165; 428/166; 428/178
(58) Field of Search .................. 428/72, 166, 174, 428/178, 141, 143, 147, 165

(56) References Cited

U.S. PATENT DOCUMENTS

| | | | |
|---|---|---|---|
| 3,813,279 A | * 5/1974 | Varner | 428/178 |
| 4,183,156 A | 1/1980 | Rudy | 36/44 |
| 4,356,642 A | 11/1982 | Herman | 36/44 |
| 4,423,000 A | 12/1983 | Teraoka | 264/524 |
| 4,698,945 A | 10/1987 | Munn | 52/221 |
| 4,722,131 A | 2/1988 | Huang | 29/450 |
| 4,912,861 A | 4/1990 | Huang | 36/29 |
| 5,311,674 A | 5/1994 | Santiyanont et al. | 36/28 |
| 5,572,804 A | 11/1996 | Skaja et al. | 36/29 |
| 5,741,568 A | 4/1998 | Rudy | 427/69 |
| 5,851,626 A | * 12/1998 | McCorry et al. | 428/95 |
| 5,896,680 A | 4/1999 | Kim et al. | 26/28 |
| 5,976,451 A | 11/1999 | Skaja et al. | 264/516 |
| 6,029,962 A | 2/2000 | Shorten et al. | 267/145 |
| 6,098,313 A | 8/2000 | Skaja | 36/28 |

FOREIGN PATENT DOCUMENTS

| | | | |
|---|---|---|---|
| EP | 0 530 042 A1 | 8/1992 | ........... B60R/21/04 |
| EP | 0736278 | 10/1996 | |
| WO | WO 91/11928 | 8/1991 | |

* cited by examiner

Primary Examiner—Donald J. Loney
(74) Attorney, Agent, or Firm—Wong, Cabello, Lutsch, Rutherford & Brucculeri, L.L.P.

(57) ABSTRACT

A flexible shock absorbing component providing cushioning for surfaces, especially wall and floor surfaces, is described. The shock absorbing component includes two sheets of thermoplastic, each sheet with inwardly facing, opposing, resiliently compressible indentations extending into a cavity between the two sheets. The shock absorbing component also includes a layer of particulate matter applied to and adhered to the outer surface of one of the sheets, to provide wear and weather resistance. A moderator may also be attached to the outer surface of the sheet.

5 Claims, 4 Drawing Sheets

CUSHIONING STRUCTURE FOR FLOOR AND GROUND SURFACES

The present application claims priority on co-pending U.S. Provisional Patent Application Serial No. 60/240,006 filed Oct. 12, 2000. The entire text of the above-referenced disclosure is incorporated by reference herein without discretion.

BACKGROUND OF THE INVENTION

1. Field of the Invention

The present invention relates to shock absorbing components and to methods of manufacturing shock absorbing components. More particularly, the invention relates to flexible shock absorbing components used to provide cushioned surfaces or surface coverings.

2. Description of Related Art

There are many cushioning surfaces that have been used for athletic and recreational activities in indoor as well as outdoor facilities. For example, cushioned surfaces have been used for floor coverings or wall surfaces in indoor gymnasiums for indoor sports, as well as for home gyms and exercise mats. Examples of outdoor athletic and recreational areas where cushioned surfaces have been used to cover the ground include football fields, children's playgrounds, and running tracks. Not only have cushioned surfaces been used for floor coverings and/or wall surfaces in athletic and recreational fields, but they also have been used in medical and health-related areas including nursing homes, hospitals and rehabilitation centers, and for animal enclosures to aid in animal comfort and safety.

There are three principle types of prior art cushioning structures used in flooring or wall surfaces for recreational use. First, there are cushioning structures that use solid materials such as rubber or rubber particles to provide the shock absorbing characteristics. A wearcourse is the term for outermost layer that comes into contact with the user and the elements. For example, wearcourses that have been used include rubber particle surfaces for tracks, nylon fibers and other materials used for synthetic grass.

Second, wood chips or sand have been used to provide cushioning of the ground surfaces in outdoor areas such as playgrounds to help reduce the impact from falls as a result of the activity, thereby reducing the risk of injury.

Third, mechanical means have been used to cushion the impacts. For example, one such mechanical means used in cushioned floor surfaces is vertical I beams. For example, the I-beam structure has been used in shock absorbing structures where honeycomb surfaces made from rubber provide support between the ground and the upper or outer surface. The I-beams in these structures are perpendicular to the surface.

Each of the three main types of prior art cushioning structures have certain disadvantages.

The first type of cushioned surface, made from solid materials such as rubber (i.e., foam rubber) or rubber particles, has the advantage of all weather use, but also has several disadvantages. The first disadvantage relates to the cost of manufacturing and adhering two layers of material together. Two layers are typically needed because the cushioning requirements are substantially different from the surface requirements. For example, in floor coverings, the bottom layer of material typically provides the cushioning features and the top layer of material provides comfort, traction and durability. The layers must have different structures and are manufactured from different materials having different characteristics.

A second disadvantage with prior art cushioned surfaces made from rubber or rubber particles is that they do not adequately cushion a fall. This is because the prior art cushioned structures made from rubber or rubber particles do not provide adequate impact management over the range of force exerted on the surface. For example, the impact absorption is not predictable throughout the surface and, especially at high impacts, the structures fail to provide sufficient cushioning.

A third disadvantage of prior art cushioning structures made from rubber or rubber particles is their lack of durability. In the past, many of these materials, such as foam rubber, used for the bottom layer of a two-layer cushioning structure lost their cushioning ability quickly and, failed to provide adequate cushioning for a sufficiently long period of time.

Wearcourse outdoor surfaces have additional disadvantages, primarily related to installation and durability. For example, wearcourse installation is tedious, labor intensive, and fraught with human error. Installation involves precise chemical mixing and handling of chemicals, often in less than optimum conditions or in the presence of children. Additionally, the range of colors available and customization is very limited. Lateral shock dispersion, which can reduce or prevent minor injuries such as broken fingers or skin abrasion, also is severely lacking.

As discussed above, the second type of cushioning surface is wood chips or sand, which typically have been used in outdoor areas such as playgrounds to provide cushioning. Although wood chips or sand are low cost alternatives, they also have disadvantages. One problem is that they do not provide uniformly adequate depth to provide adequate cushioning. For example, the loose particles move around so that the actual thickness of the cushioning layer varies significantly depending upon the level of usage and maintenance in a given area. Wood chips or sand fail to provide adequate cushioning for impacts where the loose fill particles do not have sufficient depth.

A second disadvantage with the loose fill materials is that the surface may not be solid enough to permit wheel chair access, especially where the loose fill material has substantial depth. Therefore, the use of wood chips or sand in outdoor recreational facilities may present a problem in satisfying the Americans with Disabilities Act access standards.

Mechanical cushioning structures in the prior art also have disadvantages. Although they may provide acceptable cushioning at low impacts, their cushioning ability is reduced at higher and more dangerous higher impacts. That is due to the tendency of prior art structure to buckle at high levels of impact. Specifically, we have found that prior art I-beam cushioning structures tend to buckle at a high level of impact, rendering this cushioning structure ineffective at some point during the impact.

SUMMARY OF THE INVENTION

This invention overcomes the above mentioned problems and disadvantages by providing a cushioning surface especially suited for recreational use, for both indoor and outdoor activities. The cushioning structure of the invention provides a surface having improved lateral shock dispersion, and improved impact protection. For example, the present invention provides superior impact protection for impacts due to falls of six feet or more onto the surface.

The invention provides a cushioning structure made of interconnected tiles that are fastened together to provide a continuous and smooth cushioning surface. Each tile is made from one or more sheets of thermoplastic material. In a preferred embodiment, two thermoplastic sheets are used. The thermoplastic material is preferably in the range of 0.005 to 0.100 inches, and most preferably about 0.050 inches. Thermoset elastomers or other thermoplastic rubber materials may be used for the sheets to handle larger temperature ranges.

Each sheet of thermoplastic material has a number of indentations therein, each indentation having a hemispherical or elliptical cross section. The hemispherical or elliptical shape of each indentation provides shock absorbing characteristics having a number of advantages in cushioning and durability. The indentations are made by thermoforming each sheet in a mold having hemispherical or elliptical protrusions. Each tile, after the indentations are thermoformed therein, will have a thickness of preferably about one inch in its non-compressed state. When two sheets are used, the thickness of a tile is preferably about two inches. In the two sheet configuration, indentations in each sheet face inwardly and may abut or be joined together. Two inches is preferred as the thickness, and it has been determined that a thickness of two inches will comply with ASTM playground standards. However, the thickness of the two sheets, when they are combined together, may be 12 inches or more in thickness.

One advantage of the present invention is that the top surface spreads the impact or load over a large cross sectional area of the cushioning layer. Another advantage of the present invention is that cushioning tiles may be manufactured and shipped at one location, and then installed at the desired site. Another advantage of the present invention is that the installation of the cushioning tiles requires far less labor than the prior art rubber or rubber particle cushioning structures. Another advantage of the present invention is that tiles having varied properties can be connected together at the installation site to accommodate different cushioning needs. For example, tiles having greater cushioning ability can be installed at equipment locations where risks are higher, while tiles having less impact protection can be installed in other lower risk areas.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DETAILED DESCRIPTION OF THE PREFERRED EMBODIMENTS

The present invention relates to a twin sheet structure specifically adapted for floor or wall cushioning. The twin sheet structure includes a first sheet with indentations and a second sheet with indentations that abut the indentations extending from the first sheet. A twin sheet structure having hemispherical indentations is shown in U.S. Pat. No. 6,029,962 to Joseph J. Skaja and Martyn R. Shorten. The '962 patent shows a twin sheet structure having hemispherical indentations in the sheets. The present invention provides a number of improvements that allow that structure of the '962 patent to be advantageously used for cushioning of floor and wall surfaces.

The present invention improves on the twin sheet structure of the '962 patent by adding an additional layer of material, also referred to as a wearcourse, to the outer surface of one of the sheets. The wearcourse layer provides traction, wear resistance, and resistance to temperature extremes and weather conditions. For example, the wearcourse layer may consist of rubber granules, thermoplastic, or thermoset rubber applied and adhered to the outer surface of a sheet. Although a number of other materials may be used to form the wearcourse layer according to the present invention, several materials that have been tried are described below.

Figure 1:
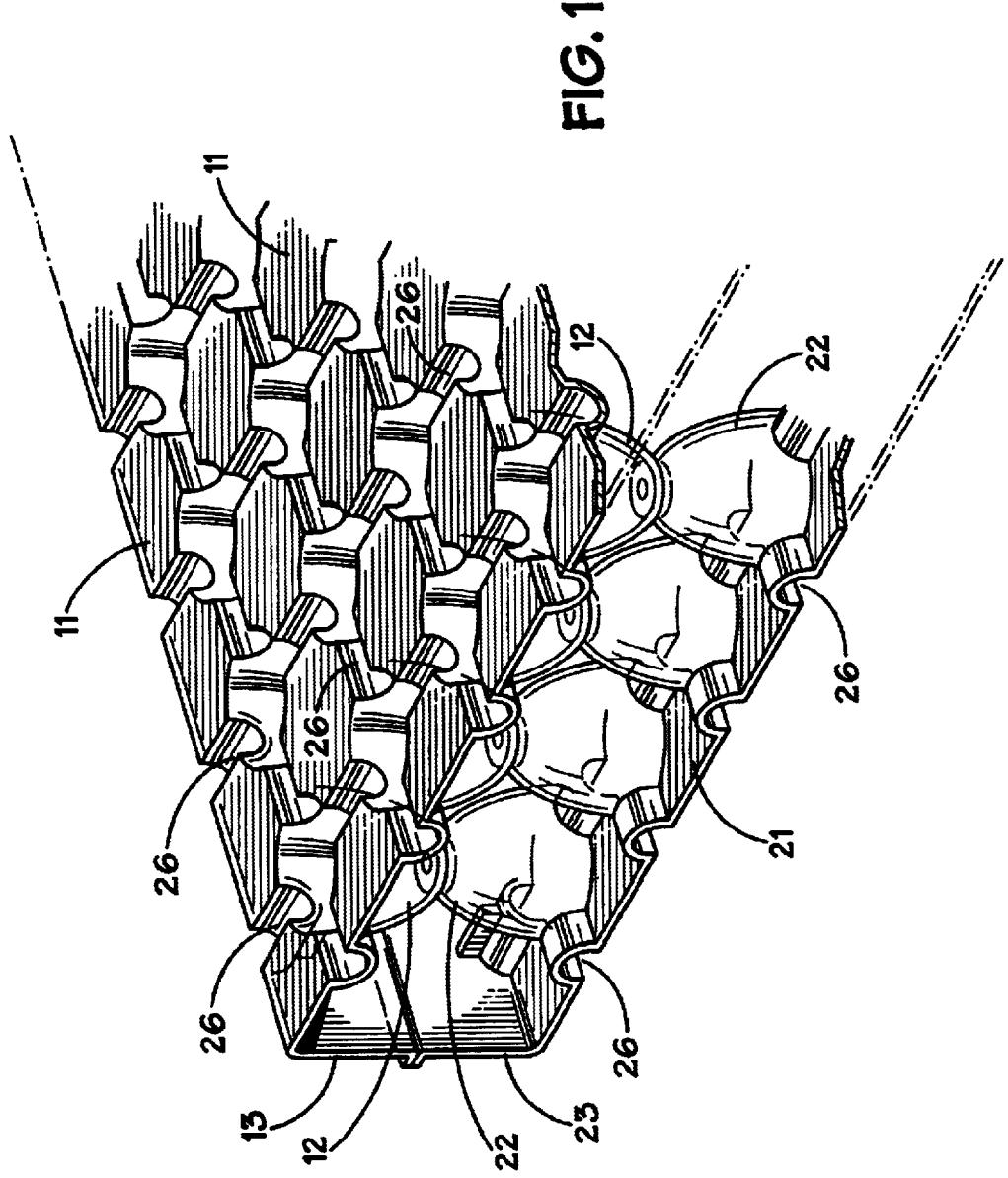
FIG. 1 is a perspective view of the twin sheet cushioning structure of the present invention.

As shown in FIG. 1, the twin sheet cushioning structure includes a first or upper sheet 11 and a second or lower sheet 21. The first sheet has hemispherical or hemi-ellipsoidal indentations 12 and the second sheet also has hemispherical or hemi-ellipsoidal indentations 22. Each indentation in the first sheet abuts a corresponding indentation in the second sheet. Drainage connectors 26 may extend between the indentations. The drainage connectors not only allow water to drain from the top sheet to the bottom sheet, but also between adjacent hemis or ellipses in the same layer. Sidewalls 13 and 23 at the perimeter of each sheet may be joined at a seam.

Figure 2:
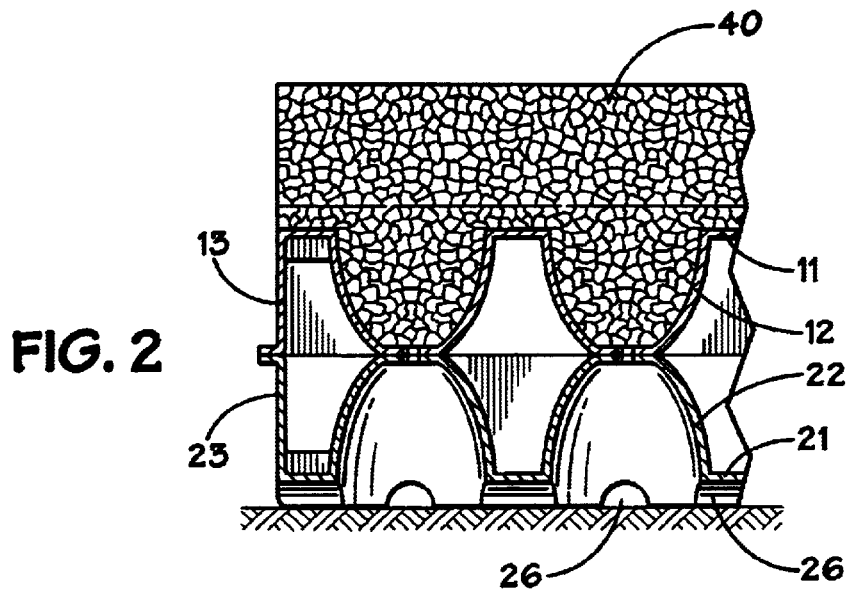
FIG. 2 is a cross section view of the twin sheet cushioning structure with a layer of rubber particles applied to the outer surface of the top sheet according to a first preferred embodiment of the present invention.

FIG. 2 shows a first preferred embodiment of the present invention. In the first embodiment, the wearcourse layer consists of rubber particles 40 applied to the outer surface of sheet 11. The rubber particles may partially or completely fill indentations 12. The rubber particles in each indentations may be loose or may be adhered together with a binder such as a urethane binder. The rubber particles may have irregular dimensions or may be spherical or some other shape if desired. Preferably, the rubber particles are elastic and each will have outward dimensions of less than 0.25 inches. Use of rubber granules to partially or completely fill some or all of the indentations helps make the cushioning structure of the invention effective and consistent across the typical temperature range for the outdoor activities.

Figure 3:
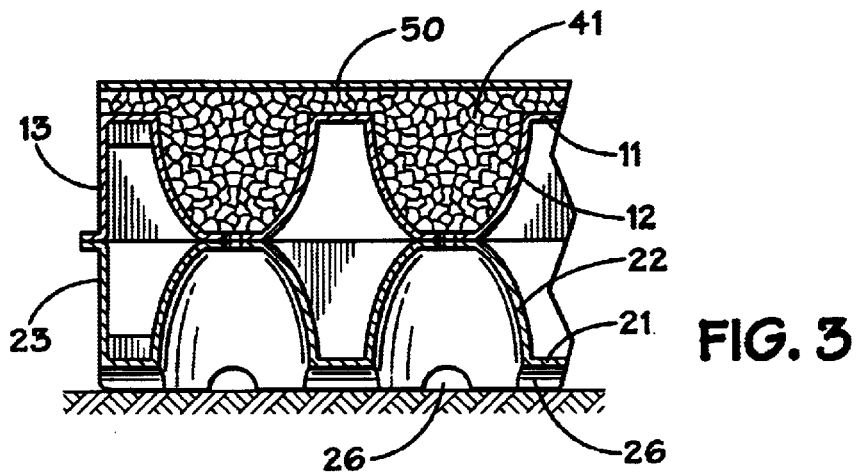
FIG. 3 is a perspective view of the twin sheet cushioning structure with a layer of rubber particles applied to the outer surface of the top sheet, plus a moderator, according to a second preferred embodiment of the present invention.

FIG. 3 shows a second preferred embodiment of the present invention. In the third embodiment, the wearcourse layer consists of moderator 50, which is a sheet of plastic or rubber material applied to the outwardly facing surface of sheet 11. The moderator may be adhered to sheet 11 with adhesive or spot welded to the outer surface of sheet 11. As shown in FIG. 3, moderator 50 may cover a layer of rubber particles 41 that partially or completely fill indentations 12. Alternatively, the moderator and sheet each may have mating protrusions and holes to fit over the protrusions, so that the moderator is engaged to the sheet. Optionally, the moderator may have additional cushioning members with a regular grid or pattern, and hemispherical protrusions that extend into indentations. The protrusions may be integral to the moderator. Optionally, fiber particles also may be applied to the outer surface of the moderator.

Figure 4:
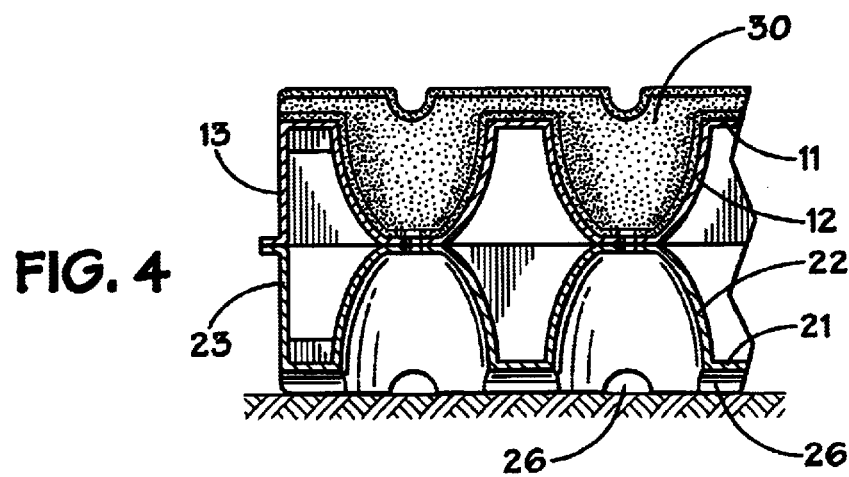
FIG. 4 is a perspective view of the twin sheet cushioning structure with a layer of fiber particles applied to the outer surface of the top sheet according to a third preferred embodiment of the present invention.

FIG. 4 shows a third preferred embodiment of the present invention. In the third embodiment, the wearcourse layer consists of fiber particles 30 applied to the outer surface of sheet 11. This process is generally known as flocking. The fiber particles (i.e., nylon, acrylic, etc.) are applied to the outwardly facing surface of one of the sheets in the twin sheet cushioning structure. Optionally, the outer surface of sheet 11 may be electrically charged to attract and adhere the fibers. If desired, adhesive also may be applied to sheet 11 to adhere the flocking material to that sheet.

Figure 5:
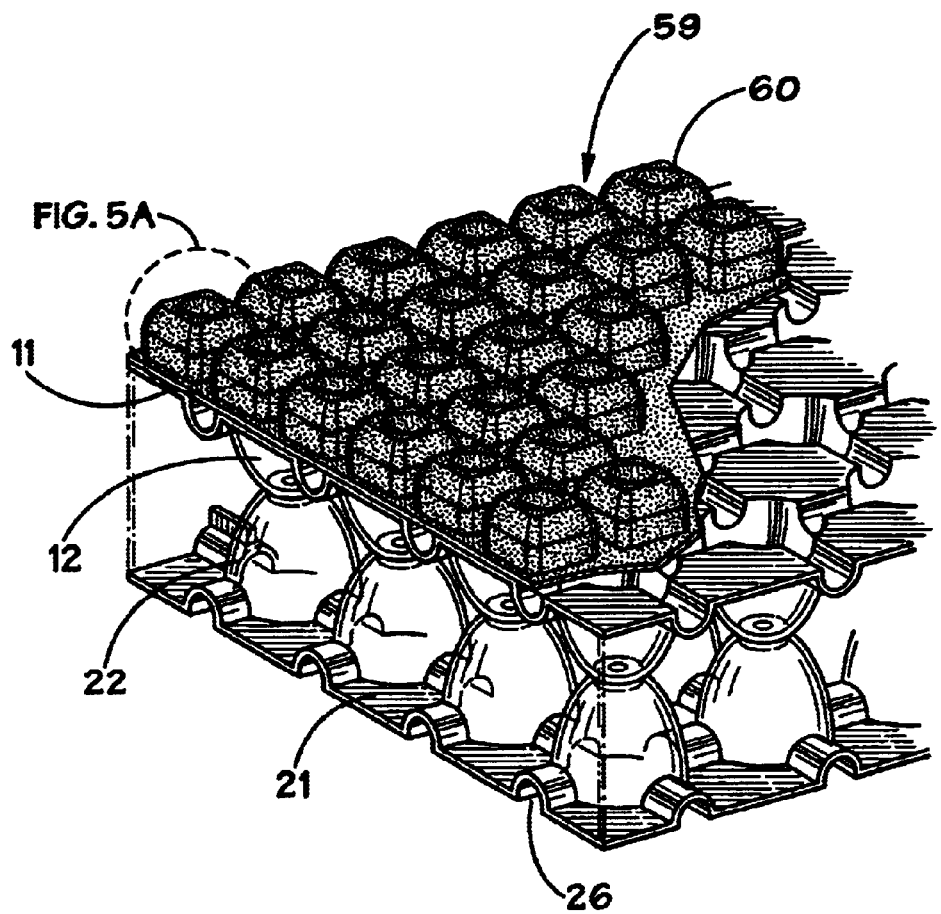
FIGS. 5 and 5A are a perspective view and expanded perspective view of the twin sheet cushioning structure with an additional cushion layer applied to the outer surface of the top sheet according to a fourth preferred embodiment of the present invention.
Figure 5A:
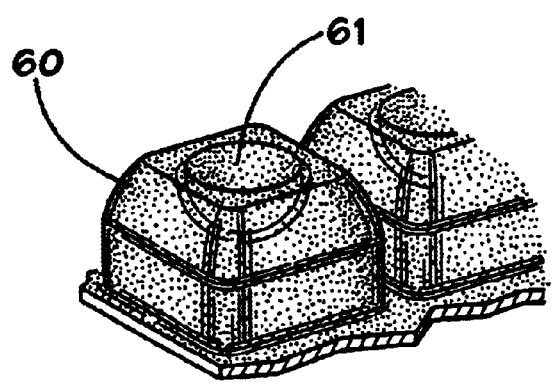

A fourth preferred embodiment of the invention is shown in FIG. 5. In this embodiment, the wearcourse layer consists of moderator 59 which is a third thermoplastic cushioning sheet applied to the outer surface of top sheet 11. Moderator 59 includes a grid of raised polygonal structures 60 with interconnecting channels therebetween. Each polygonal structure has an indentation in the top surface thereof, preferably a hemispherical or hemiellipsoidal indentation, as shown in the expanded view of FIG. 5A.

Figure 6:
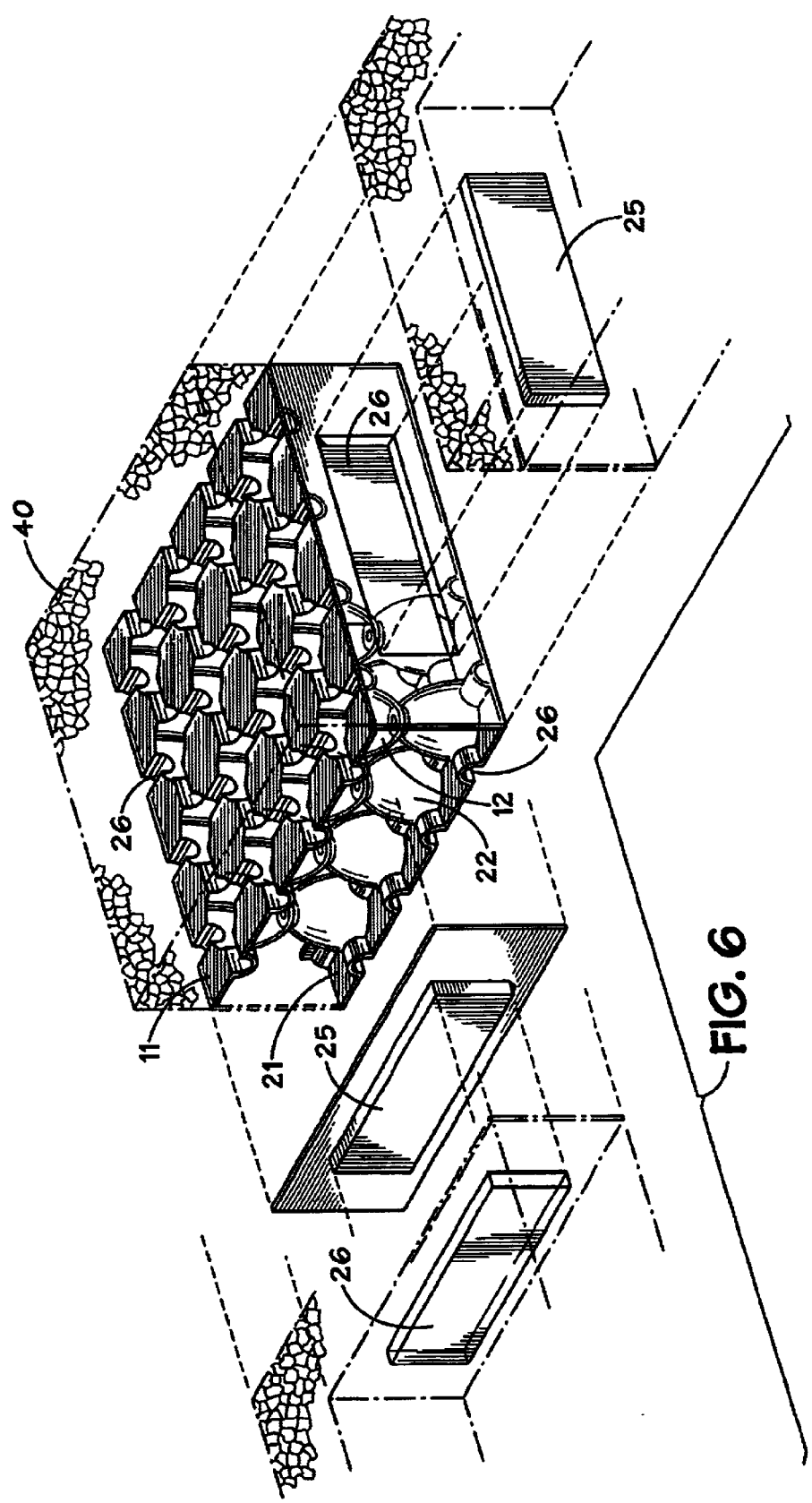
FIG. 6 is a perspective view, partially in cross section, of the twin sheet cushioning structure of the present invention interlocking tiles.

After the floor or wall cushioning structure of the present invention has been manufactured, it can be easily transported and assembled at another location, as will be described below with reference to FIG. 6. The twin sheet structure and wearcourse layer can be produced in lengths and widths limited only by the dimensions of the production equipment, which is described in U.S. Pat. No. 5,976,451 to Joseph J. Skaja and Martyn R. Shorten. For floor and wall cushioning structures of the present invention, however, it is advantageous to have the twin sheet structure and wearcourse layer sized into symmetrical tiles, and preferably square tiles. The tiles may be 12 inches on each side, for example, facilitating their shipment to the assembly site. Each tile is locked to the adjacent tiles by male and female seam locks 25, 26.

Additionally, the present invention contemplates the use of double sided tape applied to urethane film to seal the edges of each tile in the cushioning structure. Double sided tape attached to the urethane film may be used for sealing up the side of a tile, or for the seams. To apply the cushioning structure of the present invention around an obstacle, one can simply cut a hole to fit around the obstacle, take the double sided tape and attach it to urethane film, then put it around the opening in the cushioning structure.

What is claimed is:

1. A cushioning structure comprising a pair of thermoplastic sheets spaced from each other to form a cavity therebetween, each sheet having an inwardly facing surface and an outwardly facing surface, a plurality of inwardly facing, opposing, resiliently compressible indentations extending from each sheet into the cavity, each indentation having an inwardly facing projection and an outwardly facing recess, and a layer of particulate material applied to and adhered to the outwardly facing surface of one of the sheets.

2. The cushioning structure of claim 1, wherein the particulate material is fiber particles.

3. The cushioning structure of claim 1, wherein the particulate material is rubber particles.

4. The cushioning structure of claim 1, wherein the particulate material at least partially fills the outwardly facing recesses in the sheet to which the particulate material is applied.

5. The cushioning structure of claim 1, wherein at least one of the resiliently compressible indentations is hemispherical in shape.

* * * * *